United States Patent [19]

Greco

[11] 4,359,319
[45] Nov. 16, 1982

[54] VISUAL INSTRUCTION SYSTEMS FOR PRINTED CIRCUIT BOARDS

[75] Inventor: Gerard B. Greco, Brooklyn, N.Y.
[73] Assignee: Loral Corporation, Yonkers, N.Y.
[21] Appl. No.: 201,201
[22] Filed: Oct. 27, 1980
[51] Int. Cl.³ .............................................. G09B 19/00
[52] U.S. Cl. ..................................... 434/224; 29/407
[58] Field of Search ...................... 434/224, 43; 29/407
[56] References Cited

U.S. PATENT DOCUMENTS

| | | | |
|---|---|---|---|
| 2,805,471 | 9/1957 | Lowden | 434/224 X |
| 2,883,763 | 4/1959 | Schaper | 434/43 |
| 3,112,354 | 11/1963 | Urias et al. | 29/407 X |

Primary Examiner—William H. Grieb
Attorney, Agent, or Firm—Charles E. Temko

[57] ABSTRACT

A visual instruction system for the building and reworking of printed circuit boards. By superimposing a printed circuit board and a one-to-one transparency illustrating component placement, cuts, jumpers, wiring information etc., the worker is constantly apprised of the work completed, and the work remaining to be done. The method is not compatible with more highly sophisticated and expensive production assembly systems, but is intended as a prototype tool for short runs.

1 Claim, 2 Drawing Figures

VISUAL INSTRUCTION SYSTEMS FOR PRINTED CIRCUIT BOARDS

BACKGROUND OF THE INVENTION

This invention relates generally to the field of printed circuit board manufacture and rework, and more particularly to an improved system for simplifying manual operations by permitting the worker to constantly keep track of the operations he has performed on a given board, as well as of those operations which remain to be performed prior to completion.

It is known in the art to provide relatively expensive production assembly systems for this purpose, the cost of which is justified only when the production runs are relatively large. Such systems employ computer programs for the shifting of the work piece, and the positioning of individual elements thereon. However, in many instances, the number of boards to be manufactured or reworked is too small to justify an expensive installation.

SUMMARY OF THE INVENTION

Briefly stated, the invention contemplates the provision of a visual instruction system for use in conjunction with manually performed operation, the relatively low cost of which can be justified for use with the manufacture or reworking of individual or a relatively small number of printed circuit boards.

By superimposing a printed circuit board and a one-to-one transparency illustrating component placement, cuts, jumpers and other wiring information, progress is instantly confirmed by a comparison, as the work proceeds, thus allowing a lower rejection rate, and faster production of individual boards is possible.

Two variations of the superimposing technique are possible. One of such variations includes optical superimposition using a combination mirror and beam splitter element which will produce the required superimposed image, as viewed through a microscope or other optical viewing device. The build and/or rework information is drawn upon transparent overlays using translucent marking ink, and the resultant image is viewed through a magnifying device. The printed circuit board and overlay holding fixture includes an X-Y table with both nests simultaneously rotatable through three hundred sixty degrees for operator comfort. The table includes an air operated locking device and an X-Y fine adjustment vernier on the overlay nests for registration purposes. Fading is accomplished by varying the light intensity in the overlay nest.

A second variations involves video superimposition, and a pair of television cameras each providing an image to a single monitor. This monitor is preferably positioned in front of the operator so that he may instantly compare the progress of work as frequently as required. The system may be either color or black and white depending upon the importance of color coding in the particular application. Fading is accomplished through the use of a video keyer.

In the case of printed board assembly, a desired result is the elimination of component placement error possibility inherent in building from a separated assembly drawing, as well as the elimination of wiring lists, since wire call-outs can be drawn on the overlay.

In the case of printed circuit board rework, the results are even more salient. The system gives complete control to the methods or design engineer, rather than the operator. Jumper routing can be clearly shown on the board, rather than on a hanging print or drawing. The system also insures uniformity of rework regardless of the number of operators involved.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENTS

Figure 1:
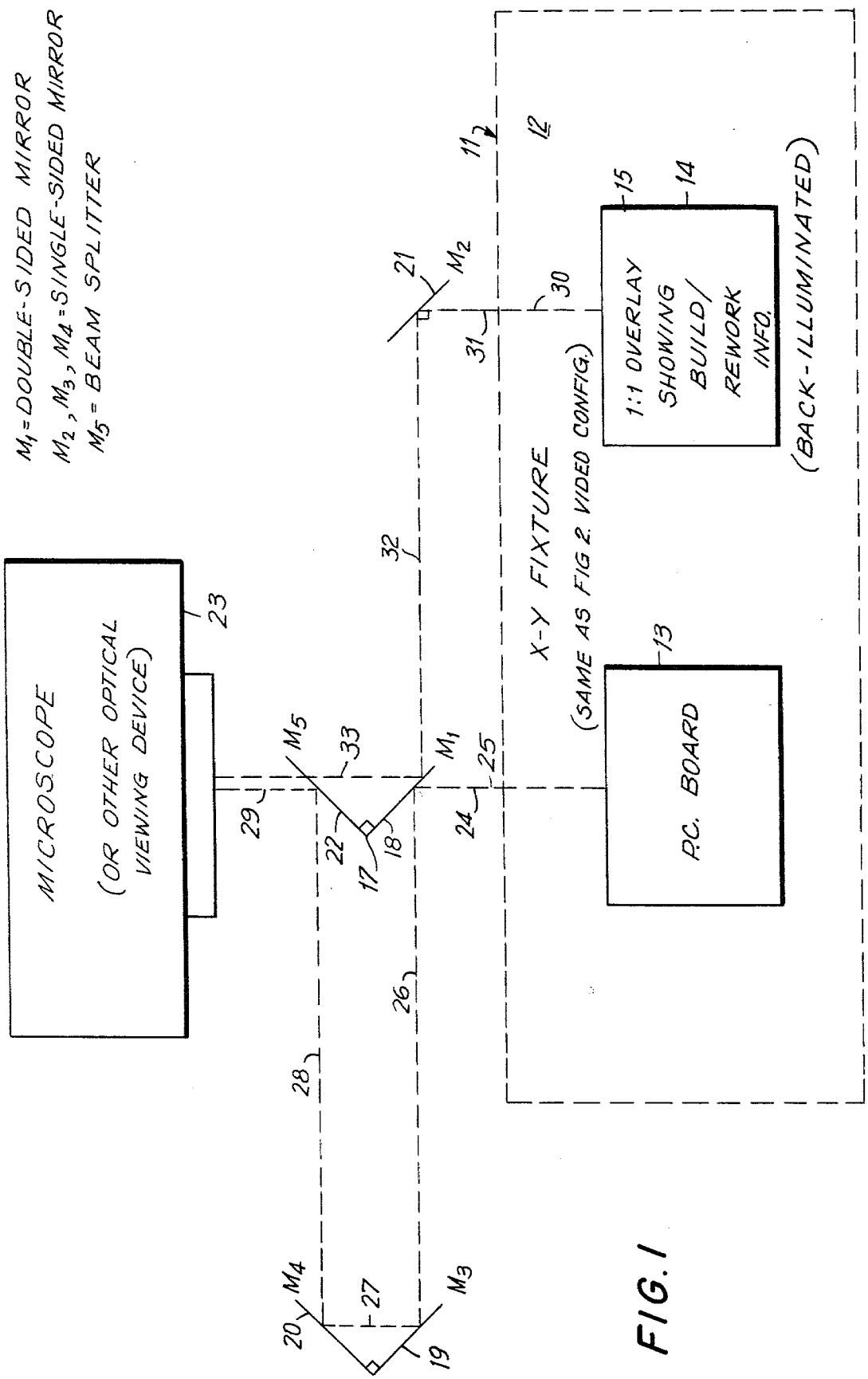
FIG. 1 is a schematic view showing a first embodiment of the invention.

In accordance with the first embodiment of the invention, as illustrated in FIG. 1 in the drawings, reference character 11 designates a conventional X-Y fixture, an upper surface 12 of which supports a printed circuit board work piece 13 at a first location, and an illuminated well 14 supporting a corresponding overlay 15 showing a representative completed work piece. The fixture 11 may include components (not shown) permitting rotation of the work piece and overlay, as well as locking means to maintain any given adjustment. Well known vernier type adjustment means may be incorporated at one of the locations for collimating purposes.

Positioned above the fixture 11 is an optical system 17 including a double sided mirror 18, single sided mirrors 19, 20 and 21, and a beam splitter 22, which may be unsilvered glass. Positioned above the work piece 13 is an optical viewing device 23 which may be a microscope, or other suitable viewer. A first path of light rays 24 includes lines 25, 26, 27, 28 and 29. A second path 30 includes lines 31, 32 and 33, the net result being the positioning of an image of the work piece and the overlay in superimposed relation within the optical viewing device.

By controlling the degree of illumination of the overlay, preferably with a foot switch, the worker can remove the image of the overlay from his optical viewing device while performing manual operations. The comparison is available by merely brightening the overlay image at periodic intervals when required, the work being fully completed when the image from the first and second locations appear identical.

SECOND EMBODIMENT

While the first embodiment is entirely adequate for most work, occasionally, because of the size of the work piece, and other considerations, it is desirable to have the comparison illustrated on a separate screen adjacent the worker's position.

Figure 2:
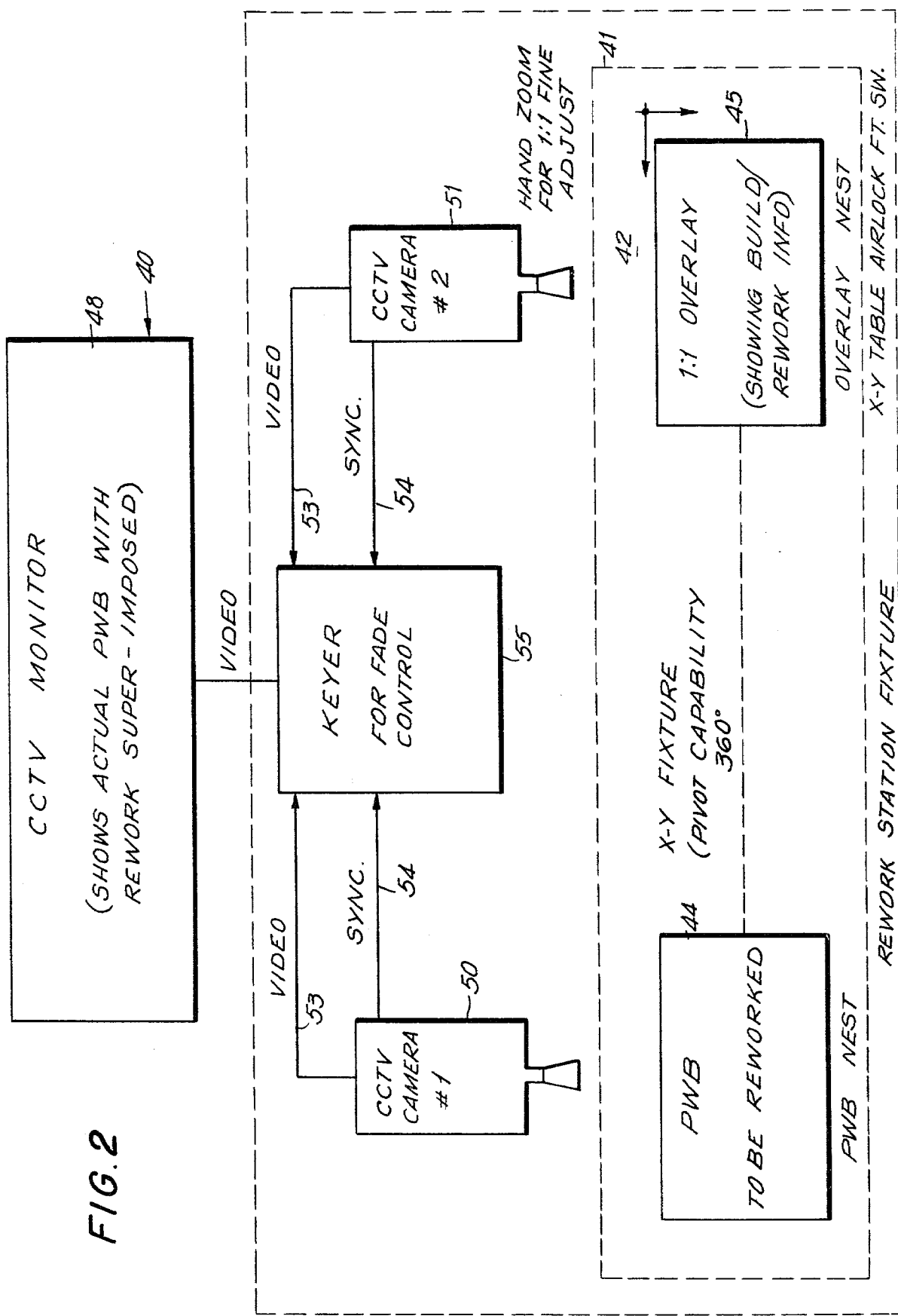
FIG. 2 is a schematic view showing a second embodiment of the invention.

Referring to FIG. 2, the embodiment, generally indicated by reference character 40 includes a conventional X-Y table 41, the upper surface 42 supports a work piece at a first location 44, and an overlay nest at a second location 45. Disposed above the surface 42 is a television monitor 48 including a conventional cathode ray tube. First and second closed circuit television cameras 50 and 51, respectively are positioned directly above the work piece and overlay nest, one of the cameras having a hand-adjustable zoom to allow for one-to-one size relation. Video 53 and synchronization 54 signal lines feed a keyer 55 which adjusts brightness control, so that the image corresponding to the work piece may be maintained at constant intensity, and the image related to the overlay may be brightened or diminished to achieve the same result as in the first embodiment.

I wish it to be understood that I do not consider the invention limited to the precise details of structure shown and set forth in this specification, for obvious modification will occur to those skilled in the art to which the invention pertains.

I claim:

1. A visual instruction system for the building and rework of printed circuit boards comprising: a work fixture having a first location for supporting a workpiece, and a second location including a back-illuminated recess positioned in spaced coplanar relation with respect to said first location; a printed circuit board workpiece disposed at said first location; a transparent corresponding sized overlay showing components and modifications to be incorporated on said workpiece disposed in said second location; and means including an optical viewing device overlying said first location and a mirror and beam splitter system conducting in highly magnified condition images from said first and second locations to said optical viewing device for displaying an image of said workpiece with said overlay to appear as positioned upon the workpiece to provide a visual comparison to an operator of the instantaneous state of the workpiece relative to a fully completed state indicated by said overlay.

* * * * *